3,380,826

FABRICATION OF IMAGE DISPLAY SCREENS

Louis F. Deary and Siegbert M. Wirth, Seneca Falls, N.Y., assignors to Sylvania Electric Products Inc., a corporation of Delaware No Drawing. Filed July 23, 1964, Ser. No. 384,808
4 Claims. (Cl. 96—36.1)

ABSTRACT OF THE DISCLOSURE

A process for photodisposing cathode ray tube image display screens wherein ingredience to retard continuing polymerization are added to the photosensitized polymeric substance associated with phosphor deposition. The retarded rate of the continuing polymerization reaction in the shadowed areas of the screen controls phosphor dot size and reduces the time periods of the screen development steps wherein the unexposed polymeric substance is removed.

This invention relates to cathode ray tube screens and more particularly to an improved method of forming a discrete phosphor pattern on a color picture tube screen.

Image display screens for cathode ray tubes of the type adapted to be employed in color television viewing apparatus conventionally comprise a transparent viewing panel having a vast number of similar patterns discretely formed thereon. Each of the patterns may consist of groups of stripes, bars, or dots of red-emitting, green-emitting, and blue-emitting cathodoluminescent materials capable of color fluorescence under electron beam bombardment. A multi-color cathode ray tube screen of this type may be fabricated by sequential photographic printing procedures wherein a separate application of photosensitized material or resist is used to secure each of the specific color-emitting fluorescent materials to the internal face of the viewing panel. For example, in fabricating a dotted color screen by this process, a thin layer of a photosensitized substance and one of the fluorescent materials is disposed on the inner surface of the panel and discretely exposed to light irradiation directed through an appropriate negative or foraminous mask thereby causing the light impinged photosensitized substance to polymerize or harden and adhere to the panel as a multitude of dot-like areas. The portions of the screen which are unexposed to light are not substantially hardened and are subsequently removed by dissolving the unpolymerized substance with a suitable solvent and rinsing same from the panel surface. This procedure is repeated in forming the second and third color-emitting cathodoluminescent areas by utilizing, in each case, a new layer of photosensitized material, a different color-emitting phosphor and a differently oriented light source thereby providing a resultant multitude of adjacently related color triads comprising the screen of the tri-color picture tube viewing panel. The sequential order for applying the various color-emitting phosphor portions is not critical. A subsequent bakeout disposes of the volatile ingredients leaving the phosphor patterned screen as a completed unit.

The deposition of the photosensitized resist material and the respective phosphor particles may be accomplished by first depositing a film of the photosensitized material on the panel and disposing phosphor powder thereupon as by the well-known dusting procedure, or it may be by the application of a suspension of phosphor in the photosensitized material as in the conventional slurry technique. Whichever method is utilized in forming the phosphor bearing film, the layer is substantially dried before being subjected to discrete light exposure.

Screen uniformity and color balance requires that the dots of the various color fields be of consistent size, be free of color contamination from adjacent color-emitting phosphors, and have adequate adherence to the panel surface.

Individual dot size and adherence are dependent upon several factors, such as mask aperture size, density of the phosphor particles contained in the photosensitized layer, and the time span of irradiation exposure which is related directly to the rate of polymerization of the photosensitized layer.

The polymerization of the material in the sensitized layer is a time response which is accelerated by heat and light in substantially the ultraviolet range. Thus, the drying of the sensitized layer, which may be a period of from six to ten minutes at a temperature ranging from approximately 80 to 100 degrees Fahrenheit, initiates what is known as a dark polymerization reaction over the whole of the screen area. While not a rapid transformation it becomes a continuing polymerization reaction even though the heat level is lowered after drying. It is to be noted that ambient room temperature and time will also initiate and effect a lesser degree of continuing polymerization reaction. Upon exposure to light, polymerization is greatly accelerated in the irradiated areas. Thus, the continuing polymerization reaction progresses in the areas of the screen discretely shadowed during exposure and is directly related to time span of exposure. If the exposure irradiation is of short duration, the amount of continuing polymerization associated therewith is of a degree to cause a lesser amount of polymerization of the phosphor-bearing resist material in the shadowed areas. Therefore the sensitized material is more easily removed from the shadowed areas during the respective developing step of the screen forming procedure.

In this specification the terminology "continuing polymerization reaction" refers to the polymerization of the resist material that is initiated by dark reaction during the drying of the resist layer and which continues in the shadowed areas during screen exposure, i.e., a dark-initiated continuing reaction.

Phosphor body color is a major factor in determining the length of exposure for the formation of the respective color screen pattern. This important characteristic of cathodoluminescent phosphors relates to the degree of translucency or opacity of the particular color-emitting phosphor crystal. Those phosphors that are substantially translucent are conventionally classed as having a desirable white body color which enhances the transmission of light therethrough during screen fabrication. The various color-emitting cathodoluminescent phosphors conventional to the art have representative body colors of differing degrees of translucency which, when utilized in screening, require a span of exposure commensurate thereto. When the resist has associated with it a blue phosphor such as zinc sulfide, having substantially a white body crystal, a relatively short time span of light irradiation is required to polymerize dsired dot sized areas of the photosensitized layer and effect a depth of polymerization to achieve adherence of the dots to the panel surface. A green phosphor, such as zinc cadmium sulfide, has a slightly yellowish body color because of the cadmium sulfide content; therefore, a somewhat longer time span of light irradiation is required to penetrate the phosphor and achieve the desired amount of polymerization of the color dot field in the resist layer. Since the continuing polymerization reaction in the shadowed screen area, which was initiated during the drying of the sensitized resist layer, continues to progress during the time span of pattern exposure, a greater degree of polymerizaion of the shadowed resist material is effected. This requires a longer developing step to remove the partially polymerized material from the shadowed screen area. For example, the blue field may require a development period of almost four minutes while the green field may require approximately six.

Hardening of the resist associated with the reposition of a red phosphor, such as zinc cadmium sulfide, requires a still longer period of light exposure since these phosphor particles, being of a yellow-orange body color and having less translucency than the green because of a greater cadmium sulfide content, markedly slows down the penetration of the light irradiation and the resultant rate of resist polymerization. Thus, to achieve the degree of polymerization necessary for adequate red dot adherence, a much longer time span of light exposure is necessary than for the other color phosphors utilized in the screen compositions. While the apertures in the foraminous mask remain constant, the longer period of light irradiation tends to produce dots of sizes larger than desired. The ultraviolet irradiation defining the red dots becomes of sufficient duration to have a diffusive value which, in conjunction with the continuing polymerization reaction in the shadowed area, tends to extend the polymerization of the red-associated resist material beyond the desired peripheries of the red dots into the edges of the previously disposed adjacent color dots thereby causing deleterious adherence of contaminating red phosphor particles thereto. This cross-contamination of red phosphor dilutes the fluorescent color purity of the adjacent greens and blues. In addition, this longer period of exposure irradiation prolongs the continuing polymerization reaction in the shadowed resist area which aggravates adequate removal of the resist material. Thus, it is evidenced that the continuing polymerization reaction in the shadowed areas creates several aggravating problems from the viewpoint of both quality and manufacturing. In summary, these are manifest in the form of larger than desired color dot sizes, cross-contamination of color-emitting phosphors, the subjection of previously disposed portions of the screen to lengthy development periods, and the consequentially protracted fabrication time requirement.

Accordingly, it is an object of the invention to reduce the aforementioned disadvantages and to improve the forming of color cathode ray tube screens employing light polymerized materials for discrete phosphor particle adherence.

Another object is to facilitate improved quality of color cathode ray tube screens prepared by photographic techniques regardless of the method of phosphor particle deposition.

A further object of this invention is to produce a discretely patterned cathodoluminescent multi-color screen having well defined and optimum sized light patterned screen dot areas.

Another object is to provide photosensitized material wherein polymerization due to dark reaction and continuing reaction are substantially retarded.

A still further object is to improve the fabrication of color cathode ray tube screens and to reduce cross-contamination color effects between adjacent phosphor dots.

A further object is to efficiently fabricate a multi-color screen for cathode ray tube usage.

The foregoing objects are achieved in one aspect of the invention by the provision of a process for making image display screens which utilize the addition of continuing polymerization retardative ingredience to the photosensitized polymeric substance associated with the screen deposition of the respective color-emitting phosphors. The retarded rate of the continuing polymerization reaction in the shadowed screen areas lessens the time spans of the respective screen development steps required to remove the unexposed polymeric substance. This provides for adequate control of phosphor dot size, minimizes cross color contamination, and desirably reduces the time requirement necessary for screen fabrication.

In this specification, the term "ingredience" refers to one or more ingredients.

For a better understanding of the present invention, together with other and further objects, advantages, and capabilities thereof, reference is made to the following disclosure and appended claims.

In a method of forming a discrete phosphor patterned cathodoluminescent screen, such as an array of red, green, and blue color-emitting phosphor configurations on a color television cathode ray tube viewing panel, in accordance with the invention, there is applied to the panel or screen support portion of the tube a resist layer of a clear radiant energy sensitive polymer substance with a sensitizer and continuing polymerization retardative ingredience additive thereto. This material may be applied by slurrying, flowing, spraying, or by any other well known operation to provide a film-like layer of consistent thickness and even surface. Cathodoluminescent phosphor particles may be incorporated therein or subsequently added thereto as by a dusting procedure as described in U.S. Patent 3,025,161 granted Mar. 13, 1962, to T. V. Rychlewski.

The cathodoluminescent phosphor materials employed in fabricating the screen may be formed from a number of conventional color-emitting phosphors including sulfides, oxides, tungstates, aluminates, borates, selenides, or silicates of one or more of the metals included in the group of zinc, cadmium, beryllium, magnesium, manganese, calcium, strontium, and others conventionally so utilized. These phosphor materials may be activated by metals, such as silver, copper, manganese, and others known to the art.

The photosensitized polymeric material forming the film-like resist layer on the panel may comprise any of a number of well-known formulations which are rendered nondispersible or substantially insoluble after being exposed to light rays. Included in the materials suitable for use in the production of cathode ray tube screens of the type described are examples, such as photographic gelatins and polyvinyl alcohol, sensitized with such substances as ammonium, potassium, or sodium dichromates.

The solvent or developing fluid used to dissolve the unexposed portions of the light polymerizable material is dependent upon the particular photosensitized material employed. For example, with a substance such as polyvinyl alcohol, water is a suitable solvent.

The substantially continuing polymerization retardative ingredience may be one or more of the trihydric alcohols, such as 1,2,3-propanetriol which is commonly known as glycerol or glycerin, and 1,2,4-butanetriol.

In detail, one of the embodiments of the invention utilizes the application to the panel of a water-alcohol resist solution of a polymeric substance such as polyvinyl alcohol sensitized with ammonium dichromate and having additive polymerization retardative ingredience such as 1,2,3-propanetriol contained therein to form a thin tacky coating on the surface of the panel.

A first fluorescent material such as the green phosphor, silver activated zinc cadmium sulfide, which may be in powdered form, is then evenly deposited upon the layer of tacky coating by a dusting operation. Thus deposited, the phosphor particles adhere to the tacky surface of the sensitized polyvinyl alcohol coating. If desired, the phosphor and the sensitized polyvinyl alcohol may be applied to the panel together in the form of a slurry.

The phosphor containing resist layer is then air dried, being subjected to a temperature ranging from approximately 80 to 100 degrees Fahrenheit for a period of about eight minutes. As previously mentioned, this heat and time of the drying procedure initiates a dark polymerization reaction which slowly progresses as a continuing reaction in the dried resist layer.

A foraminous mask, grid or other type of appropriately patterned negative which will produce the desired array of bars, stripes, or dots, in this instance dots, is then positioned relative to the dry coated panel to shadow those portions of the coating that are intermediate the desired green phosphor pattern configuration. Subsequently, the coated panel is exposed through the foraminous negative to light rays emanating from a discretely positioned point source. The exposed portions of the sensitized polyvinyl alcohol coating are hardened or polymerized by the light and thereby adhere as substantially formed dots to the surface of the viewing panel to provide a binding agent for the phosphor. The time of exposure is in the neighborhood of eight to twelve minutes during which the continuing polymerization reaction in the sensitized screen areas shadowed by the mask design is minimized due to the presence of the polymerization retardative substance in the sensitized coating.

While the exact mechanics of the invention are not fully understood, it is believed that the inclusion of a small amount of 1,2,3-propanetriol in the sensitized polyvinyl alcohol mixture functions as a pseudo-filter to the longer wave lengths of radiant energy. Thus, the continuing polymerization cross-linkage reaction induced as a dark reaction by heat and time during drying is markedly retarded while polymerization cross-linkage by light is apparently uninhibited. It has been found that the continuing polymerization retarder may be added to the resist material in volumetric amounts ranging substantially from .001 to 5.00 percent depending upon the blend of polyvinyl alcohol utilized.

After exposure, the pattern is developed by washing the panel with a suitable solvent such as purified water, for a period of approximately three minutes which expeditiously removes the unexposed and unpolymerized portions of the polyvinyl alcohol and phosphor from the mask shadowed areas since the polymerization retarder has minimized the hardening and adhesion of the resist thereon.

After development drying, the panel is again coated with a layer of sensitized polyvinyl alcohol containing the polymerization retardative ingredient and a blue fluorescing cathodoluminescent material, such as silver activated zinc sulfide; the formulation of the coating being of the nature already described. The coated panel is then dried and subsequently exposed to light through the negative to polymerize the coating in accordance with the form and position of the desired blue-emitting phosphor pattern relative to the previously formed green-emitting phosphor pattern. Since the blue-emitting phosphor has a white body color that is more translucent than that of the previously disposed green, the shortened exposure time is in the neighborhood of seven to ten minutes. This exposure promotes little continuing polymerization in the shadowed screen area due to the presence of the retardative substance in the resist. Discrete off-setting of the light source and the negative relative to one another during exposure provides proper displacement of the respective phosphor patterns. The unexposed unpolymerized portions of the coating are again removed by a rinsing application of a solvent, such as water, for a period of approximately five minutes.

The color cathodoluminescent screen is completed with the application of sensitized polyvinyl alcohol containing continuing polymerization retardative ingredience and a red-emitting color fluorescing material such as silver activated zinc cadmium sulfide, followed by resist drying, exposure, and development operations. During the exposure operation, the light source and the discretely patterned negative are again offset from one another so that a resultant screen may be produced having innumerable triads of green, blue, and red color fluorescing dots. Since the red phosphor has a yellow-orange body color having less translucency than either of the previously disposed green-emitting and blue-emitting phosphors, a longer exposure time of approximately twenty-five minutes is required for sufficient light penetration to form the photopolymerized imprint of the negative pattern for the red disposed phosphors.

Regardless of the increased length of exposure, the inclusion of the continuing polymerization retardative ingredience in the resist layer greatly reduces the continuing polymerization reaction in the mask shadowed areas of the resist and minimizes the danger of the adjacent green and blue dots becoming cross-contaminated with red. Because of the presence of the polymerization retardative ingredience, the development time for the red field approximates that required for the others.

While the foregoing has described the inclusion of the continuing retardative ingredience (1,2,3-propanetriol) in the resist material for deposition of all of the color-emitting fields, it is quite apropos for selective utilization for one or more of the color fields. Its continuing polymerization retarding characteristics are especially advantageous when disposing phosphors requiring lengthy exposure periods.

This invention may also be advantageously utilized in conjunction with the light polymerization accelerating ingredience in the form of at least one dihydroxyl alcohol derived from the ethylene series of hydrocarbons which may be added to the resist material as described in a co-pending application, Ser. No. 384,789, filed concurrently herewith, and assigned to the same assignee as the present application.

Thus, by including continuing polymerization retardative ingredience, the sensitized polyvinyl alcohol can be desirably controlled to discretely effect desired dot size and phosphor particle adherence regardless of method of phosphor particle deposition. The continuing polymerization induced by resist drying heat is substantially retarded, cross-contamination of colors is reduced, resultant screen quality improved, and screen fabrication time decreased.

While there have been shown and described what are at present considered the preferred embodiments of the invention, it will be obvious to those skilled in the art that various changes and modifications may be made therein without departing from the invention as defined by the appended claims.

In the claims:

1. In a process for making a cathodoluminescent screen for a cathode ray tube having therein a screen support portion, the steps comprising:

forming on said screen support portion a continuous uniform layer of phosphor particles and (a) at least one photosensitized polymeric substance selected from the group consisting essentially of gelatin and polyvinyl alcohol; said photosensitized polymeric substance having polymerization retarding ingredience therein in the form of a trihydric alcohol selected from the group consisting of 1,2,3-propanetriol and 1,2,4-butanetriol to provide to said polymeric substance retardation of polymerization due substantially to a dark-initiated continuing reactions;

drying said photosensitized layer;

exposing portions of said layer to light rays through a discretely patterned negative to form a photopolymerized imprint of said pattern in said layer whereby the polymerized growth of said exposed portions is substantially light activated; and developing said pattern by rinsing with a developing fluid for a period of time sufficient to remove the unexposed unpolymerized portions of said layer from said support portion, said period of time being of relative short duration due to the influence of said polymerization retarding ingredience.

2. In a process for making a cathodoluminescent screen for a cathode ray tube having therein a screen support portion, the steps comprising:

forming on said screen support portion a continuous uniform layer of phosphor particles and (a) at least one photosensitized polymeric substance selected from the group consisting essentially of gelatin and polyvinyl alcohol; said photosensitized polymeric substance having polymerization retarding ingredience therein the form of at least one of the trihydric alcohols selected from the group consisting essentially of 1,2,3-propanetriol, and 1,2,4-butanetriol to provide to said polymeric substance retardation of polymerization due substantially to a dark-initiated continuing reaction, the total volumetric concentration of said polymerization retardation ingredience not to exceed five percent of said substance;

drying said photosensitized layer;

exposing portions of said layer to light rays through a discretely patterned negative to form a photopolymerized imprint of said pattern in said layer whereby the polymerized growth of said exposed portions is substantially light activated; and developing said pattern by rinsing with a developing fluid for a period of time sufficient to remove the unexposed unpolymerized portions of said layer from said support portion, said period of time being of relative short duration due to the influence of said polymerization retarding ingredience.

3. A polymeric material used with cathodoluminescent phosphor particles to form a cathode ray tube screen comprising:

at least one photosensitized polymeric substance selected from the group consisting essentially of gelatin and polyvinyl alcohol; and ingredience for retarding substantially dark-initiated polymerization of said substance in the form of at least one trihydric alcohol selected from the group consisting of 1,2,3-propanetriol and 1,2,4-butanetriol.

4. A photosensitized polymeric material according to claim 3 wherein the total volumetric concentration of said polymerization retardation trihydric alcohol does not exceed five percent of said material.

References Cited

UNITED STATES PATENTS

| | | | |
|---|---|---|---|
| 2,476,976 | 7/1949 | Grunfeld et al. ---- | 106—136 X |
| 2,537,726 | 1/1951 | Wittcoff et al. ---- | 106—136 X |
| 3,258,338 | 6/1966 | Claeys et al. ------ | 106—136 X |
| 3,164,539 | 1/1965 | Smith ------------ | 96—36.1 X |

NORMAN G. TORCHIN, *Primary Examiner.*

R. E. MARTIN, *Examiner.*

UNITED STATES PATENT OFFICE

CERTIFICATE OF CORRECTION

Patent No. 3,380,826 April 30, 1968

Louis F. Deary et al.

It is certified that error appears in the above identified patent and that said Letters Patent are hereby corrected as shown below:

Column 3, line 4 "reposition" should read -- deposition --. Column 6, lines 48 and 74, cancel "(a)", each occurrence.

Signed and sealed this 9th day of September 1969.

(SEAL)
Attest:

Edward M. Fletcher, Jr.
Attesting Officer

WILLIAM E. SCHUYLER, JR.
Commissioner of Patents